United States Patent [19] [11] 4,096,109
Watanabe et al. [45] Jun. 20, 1978

[54] POLYESTER FILMS USEFUL AS MAGNETIC TAPES

[75] Inventors: Masamichi Watanabe, Yokohama; Takuo Nakahara; Seiji Sakamoto, both of Machida; Kunio Bizen, Yokohama; Akikazu Yano, Yokohama; Yuzo Otani, Yokohama, all of Japan

[73] Assignee: Mitsubishi Chemical Industries Limited, Tokyo, Japan

[21] Appl. No.: 705,914

[22] Filed: Jul. 16, 1976

[30] Foreign Application Priority Data

Jul. 21, 1975 Japan .................. 50-88991

[51] Int. Cl.² .......................... C08K 3/16; C08K 3/26; C08K 5/09
[52] U.S. Cl. ................................ 260/40 R; 260/75 R; 260/DIG. 35
[58] Field of Search ........... 260/75 R, DIG. 35, 40 R

[56] References Cited

U.S. PATENT DOCUMENTS

| 3,567,693 | 2/1971 | Piirma | 260/75 R |
| 3,657,180 | 4/1972 | Cohn | 260/75 R |
| 3,821,156 | 6/1974 | Farrar | 260/DIG. 35 |
| 3,980,611 | 9/1976 | Anderson et al. | 260/40 R |

FOREIGN PATENT DOCUMENTS

49/21,100  5/1974  Japan.

Primary Examiner—Sandra M. Person
Attorney, Agent, or Firm—Lane, Aitken, Dunner & Ziems

[57] ABSTRACT

A polyester film is disclosed which comprises (a) a polyester mainly consisting of polyethylene terephthalate which includes first inert particles being precipitated in the polyester-forming reaction system and having an average particle diameter of 1 to 3 microns and which shows a solution haze of 25 to 75% and (b) an additive amount of second inert substance particles which are added to said polyester (a) insoluble in said polyester (a), inert to the polyester-forming reaction and have an average particle diameter of 1 to 5 microns. The film is useful as a base of a magnetic tape.

4 Claims, No Drawings

POLYESTER FILMS USEFUL AS MAGNETIC TAPES

FIELD OF THE INVENTION

This invention relates to a base film which comprises a polyester polymer mainly consisting of polyethylene terephthalate and is improved in properties required as a magnetic tape, such as abrasion resistance, anti-protrusive deformation, slipperiness and filter life.

BACKGROUND OF THE INVENTION

A magnetic polyester tape is usually prepared by applying a magnetic coating on a biaxially stretched polyethylene terephthalate film by means of a calender roll and then slitting the film into a plurality of narrow tapes. It is the most serious problem in the step of applying the magnetic coating that the so-called "debris" is generated. The debris is polyethylene terephthalate swarf which results from the abrasion of polyethylene by calender rolls when the film is passed through the rolls. This fact is described in detail in Japanese Patent Publication No. 43-23888, which is incorporated herein by reference.

Another important problem is protrusive deformation. When a film under tension is wound up, foreign matters happen to be included between adjoining turns of the film so that subsequent overlapped turns of the film may be locally protruded. The film is deformed in a loop-like shape at locally protruded portions. Such deformation prevents the uniform application of a magnetic coating, which may result in the occurrence of drop out upon use as a magnetic tape.

The friction coefficient of a film is still another problem to be considered. Since the running performance of a magnetic tape set on a tape recorder depends upon the friction coefficient, the latter should be maintaned as low as possible.

While various methods for improving all the above three properties are known, most effective is to introduce fine particles in a film to roughen the film surface. In general, fine particles can be added according to the following two methods.

In the first, precipitation methods, a catalyst such as a calcium or a lithium compound which is used in an ester-interchange reaction is precipitated during the polycondensation reaction in the form of fine particles of, in a case where calcium is used, calcium terephthalate and an oligomer calcium salt. In the second, addition method, inert fine particles are added to the reaction system.

The first method has advantages in that equipment for classifying and dispersing particles are unnecessary and the filter life (the life of a filter placed in an extruder) can be maintained for a longer period of time. However, it is difficult to control the amount and particle size of particles precipitated and particles included are inclined to be broken during the film forming process so that stable properties may not be expected in the resulting polymer film. On the contrary, the second method has advantages in that particles added are hardly broken and the particle size can be controlled so that stable properties may be expected, while it is disadvantageous in that the filter life is inclined to be reduced. Even when a film is provided with improved properties, it cannot be used in practice unless the filter life is long enough.

SUMMARY OF THE INVENTION

Therefore, it is an object of this invention to provide an improved polyester film useful as a magnetic tape which can satisfy substantially all properties requisite to the magnetic tape without lowering the filter life.

The above and other related objects and features of the invention will be apparent from the following description of the disclosure.

The inventors have made extensive investigations to provide a polyester film with properties requisite to the magnetic tape without lowering the advantage in filter life given by the precipitation method; and found that the combination of the precipitation method and the addition method under specified conditions can result in a film which can satisfy all the above-described properties requisite to the magnetic tape as well as the filter life.

According to the invention, there is provided a polyester film useful as a magnetic tape which comprises (a) a polyester mainly consisting of polyethylene terephthalate which includes first inert particles being precipitated in the polyester-forming reaction system and having an average particle diameter of 1 to 3 microns and which shows a solution haze of 25 to 75% and (b) 0.005 to 0.15% by weight of second inert substance particles which are added to the polyester (a), substantially insoluble in the polyester (a), inert to the polyester-forming reaction and have an average particle diameter of 1 to 5 microns, with the proviso that a portion of the second inert particles which consists of particles having a particle size of 3 to 6 microns is 0.004 to 0.08% by weight of the polyester.

DETAILED DESCRIPTION OF THE INVENTION

The invention will now be described in further detail.

The term "polyester mainly consisting of polyethylene terephthalate" includes polyethylene terephthalate and its copolymers with copolymerizable components or blends with other polymers which are included in an amount that does not impair the properties of polyethylene terephthalate, for example, polyesters including more than 70 mole % of polyethylene terephthalate units.

The term "solution haze" used herein designates a value obtained by determining scattered light and transmitted light resulting from the irradiation of light to a solution of polyester chips according to the given method which is described hereinbelow with reference to the examples. The determined value will vary depending upon the amount and particle size of particles contained in the polyester. Generally, the solution haze increases and decreases with the increase and decrease in amount of contained particles, respectively.

The first inert substance particles precipitated from within the polyester-forming reaction system may be obtained as follows. For example, when polymerization is carried out in a system using an alkali metal and/or alkaline earth metal as an ester-interchange catalyst in a conventional manner, particles will spontaneously precipitate in the reaction system. Particles may be precipitated by adding terephthalic acid to an ester-interchange reaction or polymerization system. Alternatively, terephthalic acid and calcium acetate may be added at the stage of polymerization to precipitate particles. Besides, any desired phosphorus compound such as phosphoric acid, trimethyl phosphate, triphenyl phosphate, phosphorous acid, trimethyl phosphite, triphenyl phosphite, etc. may be present in the reaction system. In any case, fine particles precipitated from the polyester-forming reaction system may contain at least one of elements, calcium, lithium, magnecium, balium, sodium, etc. Preferably, particles may contain calcium and/or lithium.

For example, calcium compounds consisting of calcium terephthalate and a polyester oligomer calcium salt will precipitate from within the reaction system when calcium acetate is used as an ester-interchange catalyst.

According to the invention, second inert substance particles which are substantially insoluble in the polyester and inert to the polyester-forming reaction are added to the reaction system. The second inert substance includes calcium terephthalate, lithium fluoride, and salts and oxides which contain a member selected from elements of Groups II, III and IV in the Periodic Table, for example, calcium carbonate, silica, alumina, etc. Particles which tend to coagulate to reduce the filter life are not so suitable. Most preferred are calcium terephthalate and lithium fluoride which have no tendency to coagulate.

When calcium terephthalate is used, its anhydride is particularly favorable. Since calcium terephthalate having water of crystallization, for example, a trihydride readily changes into needle particles in the presence of ethylene glycol, it is difficult to maintain the desired granular shape particles at the time of addition. Further, maximum effect can be expected when the calcium terephthalate anhydride is granular in shape. The term "granular" used herein means that a particle has a volume shape factor $\phi_v$ of 0.08–0.4. The volume shape factor is represented by the following formula:

$$\phi_v = V/D^3$$

wherein $D$ is the maximum diameter of a particle in the projection plane (micron) and $V$ is the volume of the particle (cubic microns). It is to be noted that the factor $\phi_v$ for all the particles in a group is an arithmetic mean of those for individual particles. The shape of a particle will be exactly granular or spherical when the value of factor $\phi_v$ approaches $\pi/6$.

The granular calcium terephthalate may be prepared in any desired manner. For example, a dialkali metal terephthalate such as lithium, potassium or sodium terephthalate is reacted with a water-soluble calcium compound such as calcium chloride in water to give calcium terephthalate which is in the form of plate crystals. The plate calcium terephthalate is then pulverlized and classified. Any load in the form of shear, impact, or compression load may be applied to the plate crystals, obtaining granular particles of suitable dimensions. If the reaction mixture is vigorously stirred during the precipitation of calcium terephthalate, the reaction mixture is diluted or the rate of addition is increased, particles will be finer and resemble the exact granular particle, with a slight lowering in efficiency. In any case, granular particles of calcium terephthalate anhydride having a particle size within a suitable range can be obtained by classifying the resulting particles.

An anhydride may be obtained by heating calcium terephthalate having water of crystallization at a temperature of more than 100° C, preferably from 150° to 200° C for several hours. Heat is usually applied after calcium terephthalate trihydride is formed, while it may be applied at any other stages.

As described in the foregoing, it is known to add fine particles to polyethylene terephthalate to improve the abrasion resistance, anti-protrusive deformation and slipperiness of a polyethylene terephthalate film. The inventors have formed films useful as a base for manufacturing a magnetic tape from a polyester polymer which contains inert substance particles precipitated from within the reaction system and having an average particle diameter of 1 to 3 microns and has a solution haze of 25 to 75% and made a number of experiments to improve the abrasion resistance, anti-protrusion deformation and slipperiness of films as well as the filter life during the film formation. It has been found that certain ranges of the particle size and concentration of inert substance particles to be added to the reaction system are effective for improving the relevant properties. By eliminating excessive particles, a maximum filter life as well as properties satisfactory as a magnetic tape can be obtained.

According to the invention, the abrasion resistance, anti-protrusive deformation and slipperiness can be remarkably improved by adding 0.005 to 0.15% by weight of the polymer of second inert substance particles having an average particle diameter of 1 to 5 microns to the reaction system. The addition of more than 0.15% by weight of second particles will increase the properties no more and reduce the filter life considerably to render the compound commercially impractical. On the other hand, the addition of less than 0.005% by weight cannot improve the abrasion resistance and anti-protrusive deformation to acceptable levels.

Particles having a particle size of more than 3 microns are particularly effective for improving the abrasion resistance and anti-protrusive deformation. Such particles may be prepared in the precipitation system. Since the particles precipitated are, however, susceptible to failure during extrusion and film formation, sufficient improvement in the relevant properties cannot be expected with the particles precipitated. Accordingly, particles having a particle size of more than 3 microns should occupy a certain portion of the second inert substance particles to be added to improve the relevant properties.

Though particles having a particle size of more than 3 microns are effective for improving the abrasion resistance and anti-protrusive deformation as described above, such larger particles may reduce the filter life. This means that it is not sufficient only to recommend the addition of particles having a particle size of more than 3 microns. It is contemplated to add particles having a particle size between 3 and 6 microns in an adequate amount to control the relevant properties.

Particles having a particle size between 3 and 6 microns should be added in an amount from 0.004 to 0.08% by weight to improve the abrasion resistance and anti-protrusive deformation. If the additive amount is less than 0.004% by weight, improvement in both the properties cannot be expected. On the other hand, if the additive amount exceeds 0.08% by weight, both the properties are improved no more and the filter life is considerably reduced. Consequently, the resulting compound is commercially impractical.

Furthermore, the degree of anti-protrusive deformation is not sufficiently high when higher concentrations of finer particles added are present. This fact requires that the solution haze of a film-forming compound should be less than 75% and a portion of particles added which consiss of particles having a particles size of less than 3 microns should be less than 0.07% by weight of the polymer. On the other hand, improvement in friction coefficient mainly depends on finer particles having a particle size between 1 and 3 microns. Consequently, the solution haze should be above 25% to achieve a satisfactory effect.

In case of manufacturing a film suitable for use as a magnetic tape, a special attention is directed to prevent the inclusion of foreign matters which cause drop out to occur in the tape. Therefore, the filter used in this purpose is finer than those used in other applications. The life of such a finer filter largely depends upon the amount and particle size of particles to be added. If the additive amount exceeds a requisite and adequate level or particles having a too large particle size are accidentally included, the filter life is more or less reduced. It is particularly preferred for the additive particles that particles having a particle size between 3 and 6 microns are less than 0.08% by weight and particles having a particle size of more than 6 microns are completely absent in the polymer. However, the latter requirement is too strict in practice and a possible minimum amount, for example, less than 0.025% by weight of the latter particles may be included in the polymer. It is desired that the maximum diameter of additive particles is less than 20 microns. This is also true for the precipitated particles.

Among various methods of adding fine particles to a polymer, it is most preferred to add a slurry of the fine particles in ethylene glycol before or at the initial stage of the polymerization step. Alternatively, powder particles may be added before polymerization or after the polymerization is complete and before the molding is carried out. In this case, the particles are dispersed in the polymer in an extruder.

The invention will be understood more clearly with reference to the following examples; however, these examples are intended to illustrate the invention and are not to be construed to limit the scope of the invention. Parts are by weight in the examples.

Methods of determining various properties are as follows.

Solution Haze

In 20 ml of phenol/tetrachloroethane (6/4 by weight) mixed solvent at 110° C was dissolved 2.7 g of polyester chips and the resulting solution was then cooled. Haze was determined by means of 1 cm cell of an SR type hazeometer (Nippon Seimitsu Kogaku Co. L.P.G.).

Particle Size

A microscope was used. A molded article of a polyester compound was sliced into a possible thinnest specimen, which was then inserted between cover glasses. The surface of this specimen was photographed to determine the maximum diameter of respective particles. The term "particle size" used herein designates this maximum diameter. The average particle diameter was calculated by converting values of the maximum diameter to an equivalent spherical basis. A value given at an integrated weight fraction of 50% was considered as the average particle diameter.

Friction Coefficient

The method defined by ASTM 1894-63 was modified so as to make it possible to determine with the use of a tape-like sample which was 15 mm in width and 150 mm in length. The determination was carried out at a speed of 20 mm/min.

Degree of Anti-protrusive Deformation

In the course of winding up a film, large particles having a particle size of 10 microns were introduced on purpose to locally protrude the surface of a subsequent overlapping portion of the film. Then the film was further wound until the local protrusion disappeared. The number of turns of the film was recorded. The results were classified into A, B, and C in this sequence from the best. (fewer turns).

Abrasion Resistance

A film under a constant load was reciprocated through rolls and the amount of debris generated for a certain period was weighed. The results were classified into A, B, and C in this sequence from the best (smaller amount).

Filter Life

A 1500-mesh filter having a filtration area of 31.2 $cm^2$ was placed in an extruder and a molten polymer was extruded at a rate of 8.5 kg/hr. The extruder output yielded until the pressure at the entrance of the filter reaches 250 $Kg/cm^2$ was recorded. The results were classified into A, B, and C in this sequence from the best.

A film of which any one of evaluated values on the degree of anti-protrusive deformation, abrasion resistance, and filter life belongs to class C is to be rejected because such a film can not be used in practice.

It is to be noted that a precipitated calcium compound in the examples and comparative examples is a compound containing calcium as a metal element which is formed during polymerization and precipitated in the form of polyester-insoluble particles. Similarly, a precipitated lithium compound and a precipitated calcium and lithium compound are a compound which contain lithium and a compound which contains calcium and lithium as metal elements, respectively.

Preparation of Calcium Terephthalate

In a 20-l container equipped with an agitator was placed 3.0 l of an aqueous solution of 10 wt/vol% of calcium chloride. With stirring 11.3 l of another aqueous solution of 5 wt/vol% of sodium terephthalate was added thereto. Simultaneously with the addition, the solution became milky turbid, which indicated the formation of calcium terephthalate. The agitation was continued for 30 minutes. Next, solid/liquid separation was carried out to obtain calcium terephthalate trihydride, which was then heated at 200° C for 2 hours until anhydride. The resulting particles were plate particles with a thickness of 2 to 4 microns and a maximum diameter of 10 to 30 microns. A portion sampled from the dried calcium terephthalate was introduced and milled for 1 hour in a ball mill and then diluted with ethylene glycol so as to obtain a slurry of 10 wt/vol% of calcium terephthalate in ethylene glycol. The resulting slurry was classified by means of a centrifugal separator, obtaining granular calcium terephthalate anhydride having an average particle diameter of 4.0 microns and a volume shape factor of 0.20.

All the calcium terephthalate used in the following examples are synthesized and classified in a similar manner as above.

EXAMPLE 1

In a reactor were placed 100 parts of dimethyl terephthalate, 75 parts of ethylene glycol and 0.11 part of calcium acetate. The contents was heated to facilitate the reaction and distill off the methanol formed and excess ethylene glycol. The reaction mixture was added with 0.03 part of antimony trioxide, 0.023 part of phosphoric acid and the ethylene glycol slurry of the calcium terephthalate particles having an average particle diameter of 4.0 microns (prepared separately in the above procedure). The slurry was added so that the calcium terephthalate may be present in an amount of 0.05% by weight in a final polyester. The temperature was gradually increased from 250° to 280° C, while the pressure was slowly reduced from atmospheric pressure to 0.5 mmHg.

Ester-interchange reaction was repeated in a similar manner except that calcium terephthalate was not added. There were obtained chips of polyethylene terephthalate.

The calcium compound particles formed and precipitated in the polyester had an average particle diameter of about 2.0 microns and the polyester had a solution haze of 43%. The polyester composition containing calcium terephthalate was extruded at 290° C by means of an extruder into a sheet, which was quenched and then stretched by 3.5 times in both the longitudinal and the crosswise directions. A film having a thickness of 8 microns was obtained. The friction coefficient, abrasion resistance, and degree of anti-protrusive deformation were determined for the film. Separately, a filter life test was carried out with the use of the above-described chips. The results are shown in Table 1.

EXAMPLE 2

In a reactor were placed 100 parts of dimethyl terephthalate, 75 parts of ethylene glycol and 0.10 part of calcium acetate. The contents was heated to facilitate the reaction and distill off the methanol formed and excess ethylene glycol. The reaction mixture was added with 0.03 part of antimony trioxide, 0.05 part of terephthalic acid and the ethylene glycol slurry of the calcium terephthalate particles having an average particle diameter of 3.0 microns (prepared separately in the above procedure). The slurry was added so that the calcium terephthalate may be present in an amount of 0.05% by weight in a final polyester. The temperature was gradually increased from 240° to 280° C, while the pressure was slowly reduced from atmospheric pressure to 0.5 mmHg.

Ester-interchange reaction was repeated in a similar manner except that calcium terephthalate was not added. There were obtained chips of polyethylene terephthalate.

The calcium compound particles formed and precipitated in the polyester had an average particle diameter of about 1.5 microns and the polyester had a solution haze of 65%. The polyester composition containing calcium terephthalate was processed in a similar manner as in Example 1 to obtain a two-direction stretched film. Several properties were determined for the film.

EXAMPLES 3 & 5

Example 1 was repeated except that calcium terephthalate was added in different amounts. The properties of the resulting polyester films were determined.

EXAMPLE 4

Example 2 was repeated except that calcium terephthalate was added to be 0.14% by weight in a final polyester. The properties of the resulting polyester film were determined.

EXAMPLE 6

In a reactor were placed 100 parts of dimethyl terephthalate, 75 parts of ethylene glycol and 0.15 part of lithium acetate. The contents was heated to faciliate the reaction and distill off the methanol formed and excess ethylene glycol. The reaction mixture was added with 0.03 part of antimony trioxide, 0.03 part of phosphorous acid and the ethylene glycol slurry of the calcium terephthalate particles having an average particle diameter of 4.0 microns (prepared separately in the above procedure). The slurry was added so that the calcium terephthalate may be present in an amount of 0.10% by weight in a final polyester. The temperature was gradually increased from 240° to 280° C, while the pressure was slowly reduced from atmospheric pressure to 0.5 mmHg.

Ester-interchange reaction was repeated in a similar manner except that calcium terephthalate was not added. There were obtained chips of polyethylene terephthalate.

The lithium compound particles formed and precipitated in the polyester had an average particle diameter of about 2.0 microns and the polyester had a solution haze of 25%. The polyester composition containing calcium terephthalate was processed in a similar manner as in Example 1 to obtain a film. Several properties were determined for the film.

EXAMPLE 7

Example 1 was repeated except that the ester-interchange reaction was carried out by using 100 parts of dimethyl terephthalate, 75 parts of ethylene glycol, 0.04 part of calcium acetate and 0.03 part of lithium acetate and that calcium terephthalate was added to be 0.12% by weight. Several properties of the resulting film were determined.

EXAMPLE 8

In a reactor were placed 100 parts of dimethyl terephthalate, 75 parts of ethylene glycol and 0.03 part of manganese acetate. The contents was heated to facilitate the reaction and distill off the methanol formed and excess ethylene glycol. The reaction mixture was added with 0.03 part of antimony trioxide, 0.01 part of phosphorous acid and the ethylene glycol slurry of the calcium terephthalate particles having an average particle diameter of 4.0 microns (prepared separately in the above procedure). The slurry was added so that the calcium terephthalate may be present in an amount of 0.5% by weight in a final polyester. The temperature was gradually increased from 240° to 280° C, while the pressure was slowly reduced from atmospheric pressure to 0.5 mmHg. The thus obtained polyester was blended with the polyester which was prepared in Example 1 without adding calcium terephthalate, in a weight ratio of 1:9.

The resulting blend was processed in a similar manner as in Example 1, obtaining a stretched film. Several properties of the film were determined. The results in Examples 1–8 are shown in Table 1.

Table-1

| Example No. | Particle Kind | Average particle diameter (μ) | Solution haze based upon precipitated particle (%) | Additive amount of second particles (wt %) | Amount of 3–6μ particles in second particles (wt %) | Friction Coefficient Static | Friction Coefficient Dynamic | Abrasion resistance | Degree of anti-protrusive deformation | Filter life |
|---|---|---|---|---|---|---|---|---|---|---|
| 1 | C.T.A.* | 4.0 | | 0.05 | | | | | | |
| | Precipitated Ca compound | about 2.0 | 43 | | 0.027 | 1.05 | 0.49 | B | A - B | A |
| 2 | C.T.A. | 3.0 | | 0.05 | | | | | | |
| | Precipitated Ca compound | about 1.5 | 65 | | 0.018 | 0.72 | 0.46 | B | B | A |
| 3 | C.T.A. | 4.0 | | 0.14 | | | | | | |
| | Precipitated Ca compound | about 2.0 | 43 | | 0.075 | 1.00 | 0.47 | A | A | B |
| 4 | C.T.A. | 4.0 | | 0.14 | | | | | | |
| | Precipitated Ca compound | about 1.5 | 65 | | 0.075 | 0.68 | 0.45 | A | B | B |
| 5 | C.T.A. | 4.0 | | 0.10 | | | | | | |
| | Precipitated Ca compound | about 2.0 | 43 | | 0.054 | 1.03 | 0.47 | A | A | B |
| 6 | C.T.A. | 4.0 | | 0.10 | | | | | | |
| | Precipitated Li compound | about 2.0 | 25 | | 0.055 | 1.05 | 0.46 | A | A | A |
| 7 | C.T.A. | 4.0 | | 0.12 | | | | | | |
| | Precipitated Li, Ca compound | about 2.0 | 25 | | 0.060 | 0.95 | 0.47 | A | A | B |
| 8 | C.T.A. | 4.0 | | 0.05 | | | | | | |
| | Precipitated Ca compound | about 2.0 | 39 | | 0.027 | 1.03 | 0.48 | B | A - B | A |

*C.T.A. : Calcium Terephthalate Anhydride

COMPARATIVE EXAMPLES 1 AND 2

Example 1 was repeated except that phosphoric acid was added in amounts of 0.030 and 0.005 part. Several properties of the resulting films were determined. The results are shown in Table 2.

COMPARATIVE EXAMPLE 3

Example 2 was repeated except that calcium terephthalate was not added. Several properties of the resulting film were determined. The results are shown in Table 2.

COMPARATIVE EXAMPLE 4

Example 1 was repeated except that calcium terephthalate was added to be 0.20% by weight. Several properties of the resulting film were determined. The results are shown in Table 2.

Table-2

| Comparative Example No. | Particle Kind | Average particle diameter (μ) | Solution haze based upon precipitated particle (%) | Additive amount of second particles (wt %) | Amount of 3–6 μ particles in second particles (wt %) | Friction Coefficient Static | Friction Coefficient Dynamic | Abrasion resistance | Degree of anti-protrusive deformation | Filter Life |
|---|---|---|---|---|---|---|---|---|---|---|
| 1 | C.T.A.* | 4.0 | | 0.05 | | | | | | |
| | Precipitated Ca compound | about 1.5 | 20 | | 0.027 | 1.84 | 0.54 | C | A | A |
| 2 | C.T.A. | 4.0 | | 0.05 | | | | | | |
| | Precipitated Ca compound | about 1.5 | 77 | | 0.027 | 0.67 | 0.46 | B | C | B |
| 3 | Precipitated Ca compound | about 1.5 | 65 | 0 | 0 | 0.93 | 0.65 | C | C | A |
| 4 | C.T.A. | 4.0 | | 0.20 | | | | | | |
| | Precipitated Ca compound | about 2.0 | 43 | | 0.110 | 0.57 | 0.40 | B | B | C |

* C.T.A. : Calcium Terephthalate Anhydride

EXAMPLES 9, 11 AND 12

Example 1 was repeated except that CaCO₃ particles having an average particle diameter of 5 microns, LiF particles of 3 microns and CaCO₃ particles of 3 microns were used in place of the calcium terephthalate, respectively. Several properties of the resulting films were determined. The results are shown in Table 3.

EXAMPLES 10 & 13

Example 6 was repeated except that 0.25 part of lithium acetate was used and CaCO₃ and LiF particles were used in place of the calcium terephthalate, respectively. Several properties of the resulting films were determined. The results are shown in Table 3.

EXAMPLE 14

There were shown in Examples 1–13 and Comparative Examples 1–4 the measured results on the films of 8 microns in thickness which were stretched by 3.5 times in both the longitudinal and the crosswise directions by means of a Long stretching device of non-orientation sheets extruded through a 30 mmφ T-shape die of about 5 kg of polymer and cooled suddenly.

Polymer (a) containing only precipitated calcium compound but not calcium terephthalate was synthesized in a similar manner as in Example 2. The precipitated calcium compound had an average particle diameter of about 1.5 microns and the polymer had a solution haze of 65%.

Then, in a reactor were placed 100 parts of dimethyl terephthalate, 75 parts of ethylene glycol and 0.88 part of calcium acetate and distilled off the methanol formed and excess ethylene glycol. The reaction mixture was added with 0.03 part of antimony trioxide, 0.037 part of phosphoric acid and 1.0 part of calcium terephthalate anhydride having an average particle diameter of 4.0 microns obtained by Example 1 to carry out polymerization reaction according to the conventional methods. No precipitated particle were recognized in the polymer (b).

Further, 95 parts of polymer (a) and 5 parts of polymer (b) were blended. The mixture was extruded through a 90 mmφ T-shape die, which was stretched by 4.0 times in the longitudinal direction and then stretched by 4.0 times in the crosswise direction by means of Stainer. After heating to 220° C, a film having a thickness of 12 microns was obtained.

There are shown in Table 3 the results measured on the film, which appear satisfactorily.

EXAMPLE 15

Example 14 was repeated except that polymer (b) was added 1 part in place of 5 parts. A film having a thickness of 12 microns was obtained.

The results are also shown in Table 3, exhibiting satisfactory results.

Table -3

| Example No. | Kind | Average particle diameter ($\mu$) | Solution haze based upon precipitated particle (%) | Additive amount of second particles (wt %) | Amount of 3-6 $\mu$ particles in second particles (wt %) | Friction Coefficient Static | Friction Coefficient Dynamic | Abrasion resistance | Degree of anti-protrusive deformation | Filter Life |
|---|---|---|---|---|---|---|---|---|---|---|
| 9 | $CaCO_3$ | 5.0 | | 0.05 | | | | | | |
|   | Precipitated Ca compound | about 2.0 | 43 | | 0.027 | 1.02 | 0.56 | B | A | B |
| 10 | $CaCO_3$ | 4.5 | | 0.05 | | | | | | |
|   | Precipitated Ca compound | about 2.0 | 43 | | 0.019 | 0.71 | 0.45 | B | A | A |
| 12 | $CaCO_3$ | 3.0 | | 0.05 | | | | | | |
|   | Precipitated Ca compound | about 2.0 | 43 | | 0.020 | 0.75 | 0.45 | B | B | B |
| 13 | LiF | 3.0 | | 0.05 | | | | | | |
|   | Precipitated Li compound | about 2.0 | 67 | | 0.019 | 0.60 | 0.43 | B | B | A |
| 14 | C.T.A.* | 4.0 | | 0.05 | | | | | | |
|   | Precipitated Ca compound | about 1.5 | 62 | | 0.023 | 0.82 | 0.49 | B | B | A |
| 15 | C.T.A. | 4.0 | | 0.01 | | | | | | |
|   | Precipitated Ca compound | about 1.5 | 64 | | 0.005 | 0.89 | 0.55 | B | B | A |

*C.T.A. : Calcium Terephthalate Anhydride

As obvious from data shown in Tables 1-3, films obtained in Examples 1-15 have a sufficiently low friction coefficient and a good slipperiness. The static friction coefficient may practically be less than about 1.0, preferably less than 0.8 and the dynamic friction coefficient may practically be less than 0.8, preferably less than 0.6. None of films of Examples are rated class C with respect to the anti-protrusive deformation, abrasion resistance and filter life upon manufacturing a film. It has been ascertained that excellent films suitable for use in magnetic tapes are obtained.

Comparative Examples lack any one of requirements according to the invention. Under such conditions any one or more of the anti-protrusive deformation, abrasion resistance and filter life upon manufacturing a film are extremely reduced and consequently films are impractical.

What is claimed is:

1. A polyester film useful as a magnetic tape comprising
    (a) a polyester mainly consisting of polyethylene terephthalate which includes first inert particles being precipitated in the polyester-forming reaction system and having an average particle diameter of 1 to 3 microns and which shows a solution haze of 25 to 75% and
    (b) 0.005 to 0.15% by weight of second inert particles which are added to said polyester (a), substantially insoluble in said polyester (a) and inert to the polyester-forming reaction and have an average particle diameter of 1 to 5 microns, with the proviso that a portion of said second inert particles which consists of particles having a particle size of 3 to 6 microns is 0.004 to 0.08% by weight of said polyester.

2. The polyester film according to claim 1 wherein said second inert particles are particles selected from the group consisting of calcium terephthalate, calcium carbonate and lithium fluoride.

3. The polyester film according to claim 2 wherein said second inert particles are calcium terephthalate anhydride particles.

4. The polyester film according to claim 1 wherein said first inert substance contains calcium and/or lithium.

* * * * *

UNITED STATES PATENT AND TRADEMARK OFFICE
CERTIFICATE OF CORRECTION

PATENT NO. : 4,096,109
DATED : June 20, 1978
INVENTOR(S) : MASAMICHI WATANABE

It is certified that error appears in the above-identified patent and that said Letters Patent are hereby corrected as shown below:

Columns 9 and 10, Table 2, under column heading "Additive amount of second particles" insert a parenthesis (-)-) after "(wt %".

Columns 11-12, Table 3, Lines 8 through 11 should read as follows:

| | | | | | | | | | | |
|---|---|---|---|---|---|---|---|---|---|---|
| 9 | $CaCO_3$ | | 5.0 | | 0.05 | 0.027 | 1.02 | 0.56 | B | A B |
| | Precipitated Ca compound | about 2.0 | 43 | | | | | | | |
| 10 | $CaCO_3$ | | 4.5 | | 0.05 | 0.026 | 0.84 | 0.50 | B | B B |
| | Precipitated Li compound | about 2.0 | 67 | | | | | | | |
| 11 | LiF | | 3.0 | | 0.05 | 0.019 | 0.71 | 0.45 | B | A A |
| | Precipitated Ca compound | about 2.0 | 43 | | | | | | | |

Signed and Sealed this

Twenty-ninth Day of May 1979

[SEAL]

Attest:

RUTH C. MASON
Attesting Officer

DONALD W. BANNER
Commissioner of Patents and Trademarks